United States Patent
Schmidt et al.

(10) Patent No.: US 9,826,101 B2
(45) Date of Patent: Nov. 21, 2017

(54) SYSTEM AND METHOD FOR SPECTRUM SHARING MANAGEMENT USING DYNAMIC SPECTRUM POLICY ENFORCEMENT

(71) Applicant: QUALCOMM Incorporated, San Diego, CA (US)

(72) Inventors: Jeffrey C. Schmidt, Orlando, FL (US); Thomas C. Evans, Lakeland, FL (US); Peter Stanforth, Winter Springs, FL (US); Robin U. Roberts, Orlando, FL (US); Santosh Hari, Lake Mary, FL (US); Sekhar V. Uppalapati, Longwood, FL (US)

(*) Notice: Subject to any disclaimer, the term of this patent is extended or adjusted under 35 U.S.C. 154(b) by 0 days.

(21) Appl. No.: 15/261,417

(22) Filed: Sep. 9, 2016

(65) Prior Publication Data

US 2017/0078492 A1    Mar. 16, 2017

Related U.S. Application Data

(60) Provisional application No. 62/217,070, filed on Sep. 11, 2015.

(51) Int. Cl.
| | |
|---|---|
| *H04W 72/00* | (2009.01) |
| *H04M 15/00* | (2006.01) |
| *H04W 76/02* | (2009.01) |
| *H04W 64/00* | (2009.01) |
| *H04W 4/00* | (2009.01) |

(52) U.S. Cl.
CPC ........... *H04M 15/46* (2013.01); *H04W 76/02* (2013.01); *H04W 4/005* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2005/0197118 A1* | 9/2005 | Mitchell | H04W 48/14 455/434 |
| 2010/0142454 A1 | 6/2010 | Chang | |
| 2010/0145862 A1 | 6/2010 | Chang | |
| 2011/0280180 A1 | 11/2011 | McCann | |

(Continued)

OTHER PUBLICATIONS

International Search Report and Written Opinion from corresponding International Patent Application No. PCT/US2016/051074, dated Nov. 29, 2016.

*Primary Examiner* — Shantell L Heiber
(74) *Attorney, Agent, or Firm* — Qualcomm IP Dept.; James Hunt Yancey, Jr.

(57) ABSTRACT

Policies that govern allocation of spectrum access credentials are established. The policies are configured to implement regulatory rules governing spectrum use in a geographic area. Policy establishment includes selecting, from a collection of predetermined general policy constructs that are generic to plural regulatory domains, general policy constructs to transform into protection instances. Policy parameter inputs are applied to policy parameter fields of the selected general policy constructs to establish the protection instances, the protection instances specify how regulatory rules are applied in the geographic area. Protection data values are applied to protection data fields of the protection instances to create instances of policies that are specific to the geographic area according to incumbent spectrum use in the geographic area.

18 Claims, 2 Drawing Sheets

(56) References Cited

U.S. PATENT DOCUMENTS

| | | | |
|---|---|---|---|
| 2012/0165059 A1* | 6/2012 | Schmidt | H04L 1/0016 |
| | | | 455/513 |
| 2012/0238218 A1* | 9/2012 | Stine | H04W 16/00 |
| | | | 455/67.11 |
| 2015/0011234 A1* | 1/2015 | Wei | H04W 16/14 |
| | | | 455/454 |
| 2015/0087347 A1 | 3/2015 | Roberts et al. | |
| 2015/0163671 A1* | 6/2015 | Stanforth | H04W 16/14 |
| | | | 455/411 |
| 2016/0174217 A1* | 6/2016 | Salem | H04W 72/0446 |
| | | | 455/454 |
| 2016/0381558 A1* | 12/2016 | Caulfield | H04W 16/14 |
| | | | 726/1 |

* cited by examiner

SYSTEM AND METHOD FOR SPECTRUM SHARING MANAGEMENT USING DYNAMIC SPECTRUM POLICY ENFORCEMENT

RELATED APPLICATION DATA

This application claims the benefit of U.S. Provisional Patent Application No. 62/217,070, filed Sep. 11, 2015, the disclosure of which is incorporated herein by reference in its entirety.

TECHNICAL FIELD OF THE INVENTION

The technology of the present disclosure relates generally to wireless communications and, more particularly, to a system and method for dynamically configuring and enforcing spectrum use policies to enhance spectrum sharing among diverse radios devices.

BACKGROUND

Spectrum sharing is thought of as one of the most viable ways of improving the amount of spectrum available to wireless networks and other radio devices for conducting wireless communications. But regulations hold that radios using shared spectrum in a permitted area must not cause impermissible interference in an adjacent protected area.

Spectrum is a finite resource and readily available spectrum is becoming scarce as the growth of wireless services increases. A spectrum access system (SAS) (also referred to as a spectrum management platform) may be used to manage the access to spectrum by the allocation of spectrum access permissions to wireless devices and networks. In many cases, the allocation of spectrum access permissions occurs in real-time or almost real-time following the receipt of a request for spectrum access from a radio device.

Conventional spectrum access systems are statically configured for a specific regulatory domain in which the radios managed by the spectrum access system are located and/or for the specific type(s) of radios being managed, such as TV white spaces (TVWS) radios. For example, a regulatory requirement to separate a particular radio service or class of radio devices from another may exist, such as separating broadband services and radio astronomy sites. The separation may be in terms of time, frequency and geography, or in the ability to limit RF emissions as a function of channel adjacency (or frequency proximity) between radio services. To address the particulars of each situation, each spectrum access system is constructed for a specific situation. As a result, detailed software modifications or enhancements may be needed as regulatory requirements evolve. Also, to adapt the system to a different regulatory domain, the spectrum access system may need to be redesigned. In other words, each spectrum access system is purpose built in a customized manner for each instance. This approach is not efficient, scalable or extensible.

In one example, a spectrum access system used to manage spectrum in one part of the world (e.g., the United States) maybe be very different than a spectrum access system in a different part of the world (e.g., in an Asian or European country) since the two are driven by the need to satisfy dissimilar local regulatory requirements.

SUMMARY

A spectrum policy manager that may form part of a spectrum access system leverages a common set of underlying principles of managing spectrum to establish spectrum allocation policies appropriate for the regulatory domain in which the radio devices serviced by the spectrum access system are located. The underlying principles, however, are without regard to the regulatory domain of the radio devices being serviced by the spectrum access system.

In the disclosed approach, a more efficient and reusable spectrum policy manager uses predefined, generic policy structures that are appropriately configured to construct specific policies that are, in turn, applied using sequential and combinatorial logic to efficiently enforce regulatory rules.

The spectrum policy manager may be a layer in a dynamically managed wireless ecosystem in which radio devices are present. The radio devices, in many cases, have significant flexibility in operational characteristics with respect to bandwidth, frequency of operation, modulation type, transmit power, location, time of operation, etc. As used in this document, the term radio device includes a to commonly managed group of radios forming a network. It is recognized that a radio device (or network) could operate in a manner to freely exploit much of this flexibility. But unrestricted operation is detrimental to a greater wireless ecosystem and could result in interference and degraded performance among systems. Therefore, in the disclosed approach, radio behavior is controlled in accordance with operational rules defined by a regulating entity (also referred to as a regulator). The regulating entity, in most cases, is a governmental body such as the Federal Communications Commission (FCC) in the United States or a similar agency in other countries or regions. In other situations, the regulating entity may be a facilitator of spectrum sharing, a private party, a spectrum licensee, or other entity.

In other words, radio devices may be restricted from operating in various ways for a variety of reasons, and radio operation may be maintained in accordance with recognized standards or limits. But to meet evolving market pressures and changes in technology, the spectrum policy manager allows for operational policies that bound performance limits to be readily modified to promote scalability, extensibility and efficiency of evolving wireless ecosystems.

Disclosed is a fully configurable spectrum policy manager that accepts specific configuration parameters from system administrators to enable the synthesis and application of unique spectrum policies to be applied in a managed spectrum environment. The spectrum management process makes opportunistic use of spectrum and enables radio system co-existence and interference mitigation such that radio devices (and networks) can operate coherently in time, geography and frequency.

This approach also addresses concerns often raised by regulating entities. Specifically, regulating entities are often hesitant to allow for the adoption of new technologies and tend to make overly-constraining spectrum use rules since there is a perception that it is difficult to change rules and put changes into practice once the changes are established. The spectrum policy manager allows for new or changed rules to be put into practice by spectrum administrators and users in a very rapid manner. Thus, regulators need not be concerned that radio devices will not adhere to new or changed regulations governing spectrum use. Thus, this problem is solved through an effective combination of dynamic spectrum access (to provide radio devices with spectrum access rights) and dynamic spectrum policy management (to imple-

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. System Overview

Figure 1:
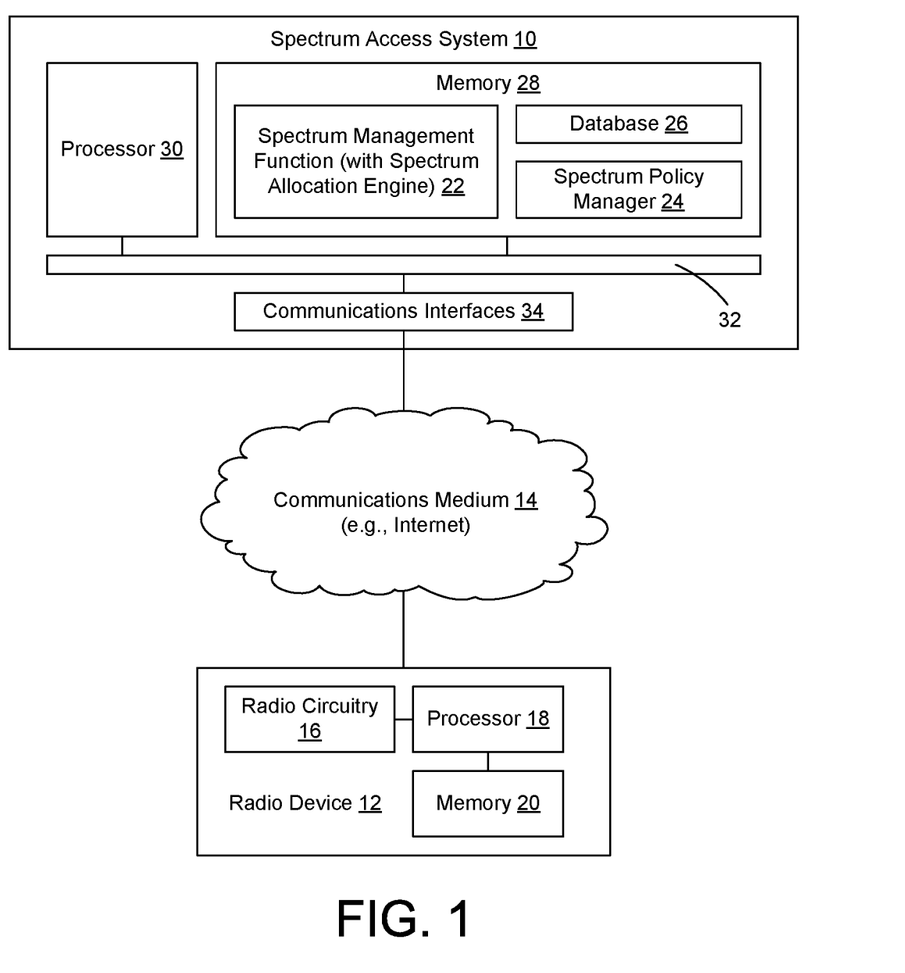
FIG. 1 is a schematic diagram of an exemplary system for managing spectrum in a dynamic spectrum access environment.

With reference to FIG. 1, shown is an exemplary system for managing spectrum that is used by various radio devices for wireless communications. The system includes a spectrum access system 10 that manages the spectrum use of one or more radio devices 12. The spectrum access system 10 may be implemented as a server or other computing system. In some embodiments, the radio devices 12 are unprotected devices that, by regulation, may not cause interference to protected spectrum users (also referred to as incumbent spectrum users). In some situations, the radio devices 12 use spectrum that is interleaved with occupied spectrum, such as would be found in white spaces environments, or have some other form of shared access to spectrum (e.g., one or more operating channels). The spectrum access system 10 and each radio device 12 are configured to carry out their respective logical functions that are described herein.

The radio device 12 may be or may include any type of electronic device that engages in wireless communications, such a mobile device (e.g., a smart phone or tablet), a computing device, an information and/or entertainment system, an Internet connectivity device (e.g., a modem and/or router) for other devices, etc.

The spectrum access system 10 communicates with the radio device 12 over any appropriate communications medium 14, such as one or more of the Internet, a cellular network, a WiFi network, a cable network, etc. In one embodiment, communications between the spectrum access system 10 and the radio device 12 may be carried out using a machine-to-machine (M2M) protocol. In addition to carrying out the operations described herein, the spectrum access system 10 may be a central spectrum access registration system or some other form of spectrum management platform. For instance, the spectrum access system 10 may host TV white space registration services for TV band radio devices (TVBDs).

The radio device 12 is location aware. For instance, the radio device 12 may be capable of determining its position (also referred to as geo-location) using a location-determining technique, such as GPS or other technology. In some embodiments, the radio device 12 may have a GPS receiver that is used to receive GPS satellite signals from which position coordinates are triangulated. Furthermore, if the radio device 12 is a mobile device, it may be capable of manually or autonomously updating its determined position as it moves. In the case of a fixed location radio device 12, the radio device 12 may be programmed with its position or may determine its position in the same way that mobile devices determine position.

The radio device 12 includes communications circuitry, such as radio circuitry 16. The radio circuitry 16 may include one or more radio modems (e.g., radio transceivers) and corresponding antenna assemblies to allow for communications over various types of network connections and/or protocols. The radio circuitry 16 may be used to carry out various wireless communications functions such as, but not limited to, engaging in voice or video calls, and sending or receiving messages (e.g., email messages, text messages, multimedia messages, instant messages, etc.), accessing the Internet, transferring data (e.g., streaming video, obtaining or sending files), etc.

In order to carry out wireless communications on some channels, the radio device 12 may be required to operate within operating parameters that are constrained by the presence of a protected device and other devices that share spectrum access with the radio device 12. To ascertain the operating parameters, the radio device 12 may seek (request) spectrum access credentials from the spectrum access system 10. The spectrum access credentials returned by the spectrum access system 10 may include operating parameters, such as one or more channels or other frequency definitions that the radio device 12 may use and/or a limit on transmit power with which the radio device 12 may transmit on channels that are shared with other radio devices 12.

Overall functionality of the radio device 12 may be controlled by a control circuit that includes a processing device 18. The processing device 18 may execute code that is stored in a memory 20. For instance, the processing device 18 may be used to execute an operating system and other applications that are installed on the radio device 12. The operating system or applications may include executable logic to implement the functions of the radio device 12 that are described herein. The memory 20 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 20 includes a non-volatile memory for long term data storage and a volatile memory that functions as system memory for the control circuit.

The radio device 12 may include any other appropriate components such as, but not limited to, a display, a speaker, a microphone, a user interface (e.g., a keypad and/or a touch-sensitive input), motion sensors, etc.

The spectrum access system 10 may be implemented as a computer-based system that is capable of executing computer applications (e.g., software programs), including a spectrum management function 22 and a spectrum policy manager 24 that, when executed, carry out functions of the spectrum access system 10 that are described herein. The spectrum management function 22, the spectrum policy manager 24 and a database 26 may be stored on a non-transitory computer readable medium, such as a memory 28. The database 24 may be used to store various information sets used to carry out the functions described in this disclosure. For instance, the spectrum access system 10 may store or access data about known protected radio devices and other radio devices that have obtained spectrum access credentials from the sever 10. The memory 28 may be a magnetic, optical or electronic storage device (e.g., hard disk, optical disk, flash memory, etc.), and may comprise several devices, including volatile and non-volatile memory components. Accordingly, the memory 28 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

To execute logical operations, the spectrum access system 10 may include one or more processors 30 used to execute instructions that carry out logic routines. The processor 30 and the memory 28 may be coupled using a local interface 32. The local interface 32 may be, for example, a data bus with accompanying control bus, a network, or other subsystem.

The spectrum access system 10 may have various input/output (I/O) interfaces for operatively connecting to various peripheral devices. The spectrum access system 10 also may have one or more communications interfaces 34. The communications interface 34 may include for example, a modem and/or a network interface card. The communications interface 34 may enable the spectrum access system 10 to send and receive data signals, voice signals, video signals, and the like to and from other computing devices via an external network. In particular, the communications interface 34 may operatively connect the spectrum access system 10 to the communications medium 14.

In one embodiment, the spectrum access system 10 may be configured to host the described services for a plurality of electronic devices, including the radio device 12. In some embodiments, the services may include spectrum management functions, such as providing available channel lists, providing channel access credentials to qualified radio devices upon registration or request so as to allow the radio devices to make use of spectrum for wireless communications, and other similar functions. Also, while the providing of services may be fully automated, the spectrum access system 10 may host an Internet-style website for the various corresponding parties to conduct initial enrollment with the spectrum access system 10, conduct manual registration if needed, access various tools and reports supplied by the spectrum access system 10, and so forth. The spectrum access system 10 also allows a user to configure spectrum use policies via a graphical user interface.

For supplying the services, the spectrum access system 10 may collect spectrum usage information from various sources, including but not limited to public databases, private databases and deployed radio devices (e.g., in the form of channel use selections or spectrum sensing results). The database 26 may contain information about known spectrum users, such as protected spectrum users (sometimes referred to as incumbent spectrum users), licensed spectrum users, or radio systems that are exempt from seeking spectrum access credentials in order to operate. The database 26 also may store information regarding policy management that is used by the spectrum policy manager, as described in greater detail below.

In embodiments of this disclosure, the spectrum access system 10 may undertake spectrum management functions other than those that are described in detail, such as responding to white space channel list requests with appropriate channel lists. Therefore, in some embodiments, the spectrum access system 10 may be considered a central spectrum "database" or spectrum registration/allocation system.

B. Spectrum Policy Manager

B(1). Basic Operation

Figure 2:
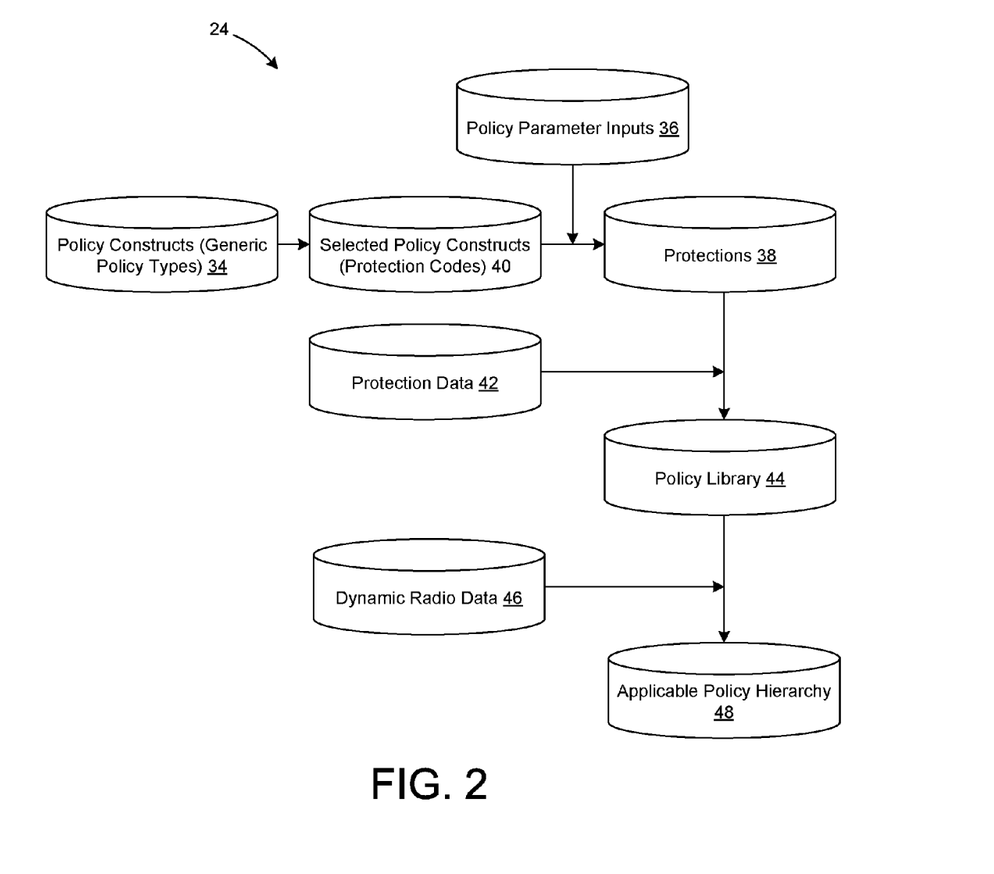
FIG. 2 is a schematic diagram of data handling in a spectrum policy manager of the system of FIG. 1.

With additional reference to FIG. 2, illustrated is an exemplary architecture for the spectrum policy manager 24. Other architectures and implementing approaches may be used.

The spectrum policy manager 24 works through the predetermination and manipulation of flexible and generic policy management constructs to enforce spectrum use rules promulgated by a regulator that controls spectrum use in a corresponding geographic area. Some spectrum agnostic rules may be enforced through the application of relatively straightforward policies. An example of a straightforward type of policy is a policy that requires all radios that use spectrum allocated by the spectrum access system 10 to unconditionally operate at no more than a transmit power limit (e.g., operate at 10 watts or less). It is relatively straightforward to apply a policy of this nature by the spectrum access system 10 by specifying an absolute limit and enforcing the limit as radio devices query the spectrum access system 10 for spectrum access or other operational instructions.

Other rules are more difficult to implement. For instance, a rule might require a radio device to attenuate RF emissions as a function of channel adjacency and relative geography with respect to other concurrently operating radio networks where those other radio networks change over time. The type of policy construct that would support this type of behavior has multiple layers of dependencies and is difficult to specify in absolute terms. The disclosed spectrum policy manager 24 and related methods are configured to implement policies of this type for many different types of regulatory environments using a flexible approach to specifying operational constraints. The disclosed spectrum policy manager 24 and related methods have the ability to create, utilize and manipulate policy constructs and establish instances of spectrum use policies in a dynamic manner so as to transform the challenging task of managing spectrum as an abstract article into a straightforward task.

In the exemplary architecture of the spectrum policy manager 24, a library of policy constructs 34 (also referred to as Generic Policy Types) is stored. Certain terms in this disclosure will be capitalized to facilitate use of common terminology throughout. Generic Policy Type is the first of these terms.

Generic Policy Types are general constructs used to define various types, or categories, of incumbent protection that share some common characteristics. Exemplary Generic Policy Types include "channel blocking" to block use of a channel as function of geography and/or time, "channel block for adjacent channel" to block or limit power on a channel adjacent to a channel occupied by a certain type of user such as an analog TV transmitter, "channel power limit" to impose emitted power limits on one or more channels based on one or more criteria, "protected area" (also referred to as "protected geographic area") determines, using a protected area definition and a path loss definition, how much power that the requesting radio device can transmit at its location without exceeding a threshold power level inside the protected area, and "exclusive allocation" to determine, using a path loss definition, how much power that a requesting radio device can transmit at its location without exceeding a threshold power level outside its protected area.

Each Generic Policy Type has one or more configurable Policy Parameters and/or one or more configurable Protection Data Parameters. The Policy Parameters that make up a Generic Policy Type may be set according to Policy Parameter inputs 36 to construct an instance of a Protection 38 that enforces a regulatory rule or imposes other desired control over spectrum allocation or use.

Each Policy Parameter that is part of a Generic Policy Type is a settable variable. For example, referring to the Generic Policy Type of "protected area", settable Policy Parameters may include the manner in which the geographic area of the protected radio system is specified in the Protection Data (e.g., as a point and buffer radius, as a polygon, etc.), the type and/or characteristics of the path loss model to apply, and the threshold power level inside the protected area.

To create a set of Policies that cover all applicable rules and implement all desired control over spectrum allocation or use, multiple Protections 38 may be specified. As part of specifying the Protections, a selection process may be used to select the applicable Generic Policy Types. Depending on the situation, one or more Generic Policy Types may be selected multiple times to accomplish multiple corresponding policy goals. For example, the Generic Policy Type of "protected area" may be selected a first time for land mobile radios (LMRs) and a second time for program making and special equipment (PMSE). The results of the selection process are selected Generic Policy Types that form a group of selected policy constructs 40.

To facilitate system management, each instance of a selected Generic Policy Type is given a Protection Code to uniquely name and identify the corresponding Protection. Also, each instance of a selected Generic Policy Type has corresponding Policy Parameter inputs 36. As indicated, the instances of the selected Generic Policy Types are transformed into Protections 38 by applying the Policy Parameter inputs 36 to the selected Generic Policy Types.

At the Protection level, each Protection Data Parameter that is part of a Protection is in variable form. The Protection Data Parameters for each Protection relate to the protection of a protected radio system (or other protected entity or construct, such as a neighboring regulatory domain) and are specified in terms of one or more of time (e.g., specified as a start and stop time), frequency (e.g., specified as a channel) and geography (e.g., specified as a boundary line, as a point and buffer, as a polygon, etc.). When the Protection Data Parameters of a Protection are completed with corresponding values, the Protection becomes an instance of a Policy. It is possible that one or more Protections are used more than once (e.g., completed with more than one set of Protection Data Parameter values, each set of values corresponding to a protected radio device) to create multiple corresponding Policy instances.

The sets of Protection Data Parameter values are collectively referred to as Protection Data 42. The Protection Data 42 may be maintained in its own database and applied to the Protections frequently enough so that the resulting Policies timely relate to protected spectrum use, as changes in the protected spectrum use occur. In one embodiment, the Protection Data 42 is applied when there are changes to the Protection Data 42. In another embodiment, the Protection Data 42 is applied on a periodic basis, such as every fifteen minutes or once an hour.

As will be understood from the foregoing and explained in greater detail below, a Generic Policy Type is used in conjunction with types of data (parameter values) to establish a specific Policy instance that is customized for the spectrum ecosystem managed by the spectrum access system 10. A collection of Policies created in this manner are stored in a Policy Library 44. The stored policies combine to enforce regulatory rules concerning the use of spectrum in the spectrum ecosystem managed by the spectrum access system 10.

When the radio device 12 request a spectrum allocation from the spectrum access system 10, Dynamic Radio Data 46 is received and/or recalled from memory 28. The Dynamic Radio Data 46 is data regarding the specific radio device 12 that requests access to spectrum and to which the Policies are to be applied. Exemplary Dynamic Radio Data includes, but is not limited to, the type of device (e.g., white space device (WSD) or other radio type), operational capabilities, supported applications, supported channels, antenna height, and location.

From the Dynamic Radio Data 46, the Policies from the Policy Library 44 that are applicable to the requesting radio device 12 may be identified. The Applicable Policies may be ordered to establish an Applicable Policy Hierarchy 48. The Policies in the Applicable Policy Hierarchy 48 may then be executed by the spectrum allocation engine of the spectrum management function 22 to establish a spectrum allocation for the requesting radio device 12. The spectrum allocation may identify one or more channels that the requesting radio device 12 may use for wireless communications, together with any time, location and/or power constraints on the use of the identified channel(s).

As indicated, the Generic Policy Type of a policy construct refers to the general category of the affiliated policy. The categories describe a protection to be achieved by the policy, such as a global channel block, a channel power limit or a protected geographic area. As another example, instances of policy constructs that form Generic Policy Types are a construct to protect a specific geographic area (e.g., where a wireless microphone system will be used) and a construct to limit the allowable transmit power on particular channel. A set of Policy Parameters that are specific to the policy construct are then configured to more specifically define how the policy construct is to be implemented and/or executed. Exemplary Policy Parameters are propagation model parameters used to determine the maximum allowable power at the edge of a protected geographic area such that interference does not occur, where maximum allowable power is a function of separation distance between a radio device (e.g., a requesting WSD) and the protected geographic area.

Protections may be designated by assigning a Protection Code to a selected Generic Policy Type. Values for Policy Parameters associated with a selected Generic Policy Type are applied to establish an instance of a Protection. Policy Parameters are the spectrum-related parameters (or units of information) that are used for each Policy that is created from the Protections, such as field strength limit or propagation model parameters. Protections are used to pre-organize specific instances of Policies by group or category before the Policies are established by the populating of Protection Data Parameters of the Protections with Protection Data. Protection Data is the data that defines the protection afforded to a specific radio device or other protected entity. Protection Data is typically specified in terms of one or more of time, channel(s) or geographic area. Protection Data may change over time and, therefore, may be applied on a periodic or as-needed basis to the Protections to establish a new set of Policies each time the Protection Data is applied to the Protections.

The Policies are applied when a requesting radio device 12 seeks access to spectrum from the spectrum access system 10. Dynamic Data regarding the requesting radio device 12 is used as part of a determination of which Policies to apply and, in one embodiment, an application order for the applicable Policies is determined. The applicable Policies are then considered in conjunction with the Dynamic Data to create a spectrum access permission (e.g., available channel list and/or other operating parameters) for the requesting radio device. The requesting radio device 12 then may carry out wireless communications using spectrum authorized for use by the spectrum access permission.

It is possible that the Protections are dynamically managed depending on changes in the spectrum ecosystem. For instance, Protections may be added or removed, and Protections may be modified by modifying the selected Generic Policy Types and/or by modifying the values of the Policy Parameters that form part of the Protections. Changes in regulatory rules may be a trigger for changing the Protections.

In some instances, a policy construct is unrelated to any spectrum-related parameters. In this case, there may not be any Policy Parameters for a Generic Policy Type and/or a Protection stemming from a selected Generic Policy Type for which a Protection Code is assigned. For instance, for "global channel blocking" to protect a channel for the entirety of the managed geographic area, there may be no Policy Parameters for the establishment of a Protection. Protection Data may be used to specify the channel to be protected when establishing a Policy from the Protection.

There also may be some governing conditions on spectrum use that are universal to the managed geographic area. These universal conditions may be implement through establishment of Policies that fall outside the describe Policy establishment approach of using intermediate Protections. These Policies may be defined and applied through a set and enforce approach. Set and enforce Policies involve the specification of absolute limits (e.g., radio transmit power) that are unconditionally enforced. The constructs to apply these types of set and enforce Policies may be pre-provisioned within the spectrum policy manager 34 and, in one embodiment, are implemented by a system administrator by configuring a threshold value (e.g., hours of allowable operation, a transmit power limit, etc.) and any other related parameters (e.g., radio type to which the Policy applies, etc.).

The disclosed approach of establishing Policies allows the spectrum policy manager to establish Policies that address every (or nearly all) permutation and scenario in which the dependencies of a Policy are related to one or more of time, geography, frequency (e.g., channel), calculated parameters (e.g., results from the application of a path loss model), and concurrent operation of one or more other radio devices, including radio devices of the same type and/or different types. As disclosed herein, a solution is presented that involves defining generic policy constructs, configuring generic policy constructs for specific policy application, and applying the policies via sequential and combinatorial logic so that the appropriate polices are applied efficiently and without contention.

B(2). Detailed Implementation

In one embodiment, the spectrum access system 10 manages spectrum use by radio devices 12 in a geographic area (e.g., a regulatory domain or other geographic area) for a pre-determined frequency range or ranges. The frequency range or ranges may be segmented into channels of identifiable bandwidths or other frequency attributes. The channels are typically numbered for identification. The disclosed techniques will be described in the context of identifying one or more available channels that a requesting radio device 12 may use and any constraints on the use, such as an allowable transmit power limit. The disclosed techniques may be used in other contexts.

Policy Parameters and Protection Codes are used to customize Generic Policy Types to create a library of Protections for the managed geographic area. It is contemplated that for each unique regulatory domain, there will be a corresponding library of Protections. The Protections for various regulatory domains may vary from one another since the attributes and characteristics of the regulatory domains typically will vary, particularly in terms of applicable regulatory rules.

The Protection Data to be applied to a Protection in order to establish an instance of a Policy may contain the Protection Code of the appropriate Protection so that the Protection Data may be readily associated with the appropriate Protection. In one implementing embodiment, the Protection Data for each Protection is maintained in a database structure, which may be in a spreadsheet or table format with one row of data values per Policy instance to be established. In this embodiment, a column of the spreadsheet may contain the appropriate Protection Code values. The database of Protection Data may form or may be translated into an import file that is imported and applied to the Protections at appropriate times. In the embodiment where the Protection Data is in a spreadsheet or table format, the import file may be a comma separated values (CSV) file.

In one embodiment, the Policy Parameters may be configured during a system setup and revised on an as needed basis and the Protection Data may be imported, also at system setup and any appropriate times thereafter. These data sets may be imported and configured separately since Policy Parameters are used to define how a policy is applied, while Protection Data is used to specify what is protected. For these purposes, the spectrum policy manager 24 has a graphical user interface and other data input features for populating the Policy Parameters and Protection Data, and carrying out other data input functions.

Exemplary Generic Policy Types and corresponding Policy Parameters fields to be completed with values are shown in Table 1.

TABLE 1

| Generic Policy Type | Policy Parameters |
|---|---|
| Channel Blocking | None |
| Channel Power Limit (used to define a global transmit power level, on a per channel basis) | Power level (dBm) |
| Protected Geographic Area (used to define a maximum transmit power level for a requesting radio device, which is calculated to protect an area) | Power level (dBm)<br>Hata environment (Urban, Suburban or Rural)<br>Default transmit antenna height (meters)<br>Default receive antenna height (meters) |
| Exclusive Allocation | Power level (dBm)<br>Hata environment (Urban, Suburban or Rural)<br>Default transmit antenna height (meters)<br>Default receive antenna height (meters) |

Policies for a managed geographic area may be created according to the following approach:
  select appropriate Generic Policy Types;
  for each desired Protection instance, associate a unique identifier (e.g., Protection Code) with each corresponding selected Generic Policy Type, for each Protection instance, customize Policy Parameters, which may be carried out by a system administrator through a user interface (UI) of the spectrum policy manager 24, and import Protection Data for each desired Policy instance, where defining the Protection Data may be performed in conjunction with a Protect Data automation function that identifies protected radio devices and creates appropriate entries in the data fields of the database structure for the Protection Data.

Table 2 shows an exemplary collection of Protections. Each row represents a Protection by Protection Code, Generic Policy Type, fields to be completed with Protection Data, and Policy Parameters fields from Table 1 that have been completed with exemplary values.

TABLE 2

| Protection Code | Generic Policy Type | Protection Data Fields (applied for each Policy instance) | Policy Parameters (applied for each Protection instance) |
| --- | --- | --- | --- |
| MIC_SAFE | Global Channel Blocking | Channel(s) | none |
| NOT_AVAILABLE | Global Channel Blocking | Channel(s) | none |
| TV_ADJ_DIGITAL | Global Channel Blocking | Channel(s) | none |
| TV_BROADCAST | Global Channel Blocking | Channel(s) | none |
| TV_ADJ_ANALOG | Channel Power Limit | Channel(s) | Power level = 20 |
| CO_BORDER | Protected Geographic Area | Channel(s) Line/LineString | Power level = −115 dBm Hata environment = Suburban Default TX Antenna Height = 1.5 m Default RX Antenna Height = 1.5 m |
| LMR_TX | Protected Geographic Area | Channel(s) Point + Buffer Start time Stop time | Power level = −115 dBm Hata environment = Suburban Default TX Antenna Height = 1.5 m Default RX Antenna Height = 1.5 m |
| PMSE_TX | Protected Geographic Area | Channel(s) Point + buffer Start time Stop time | Power level = −115 dBm Hata environment = Urban Default TX Antenna Height = 1.5 m Default RX Antenna Height = 1.5 m |

As indicated, the values for the Protection Data may be imported from a data structure, such as via a CSV file, a table, a text-based file, or other format. One or more Protection instance may have more than one set of values for the Protection Data. The application of each set of Protection Data values results in a Policy instance. To distinguish the desired Policies, each set of values for the Protection Data may include a unique identifier that is carried through the corresponding Policy. The identifiers are described in greater detail in connection with Table 3, which appears below.

The conceptual policy construct represented by the Protections from Table 2 will be described for purposes of an exemplary description. Some of the Protections are derived from the Generic Policy Type for "Channel Blocking" to establish a Protection that is applied across the entire regulatory domain (or a defined portion thereof) on a per channel basis. For example, the Protection represented by the Protection Code "NOT_AVAILABLE" allows for the establishment of one or more channels that none of the requesting radio devices 12 are allowed to use by designation of the system administrator or other reason. The Protection represented by the Protection Code "TV_BROADCAST" is used to establish protections for TV transmitters. The Protection represented by the Protection Code "MIC_SAFE" is used to establish a safe harbor channel for wireless microphone systems. The Protection represented by the Protection Code "TV_ADJ_DIGITAL" is used protect digital TV transmitters from interference from radios operating on adjacent channels. Another exemplary Protection could be established for high priority channels under the Protection Code "HPC."

Protections derived from the Generic Policy Type for "Channel Power Limit" are used to enforce a maximum radio transmit power across the entire regulatory domain (or a defined portion thereof) on a per channel basis. The exemplary Protection in Table 2 derived from the Generic Policy Type for "Channel Power Limit" has the protection code "TV_ADJ_ANALOG." This protection places limits on radiated power on channels adjacent channels occupied by analog TV transmitters.

Other exemplary Protections in Table 2 are derived from the Generic Policy Type for "Protected Geographic Area." These are Protections that are applied to a specific area on a per channel basis and are typically configured for the purposes of avoiding interference with an incumbent radio system. In the example, a HATA propagation model is used to determine buffer distances between requesting radio devices and a protected geographic area. Other propagation models are possible. A Policy Parameter may be used to select from choices of propagation models and additional Policy Parameters may be used to set parameters associated with the selected propagation model.

A Protection associated with the Protection Code "LMR_RX," for example, may be used to protect an area associated with a land mobile radio (LMR) where the area is specified by a point and buffer or by a polygon. As an alternative, the Protection shown in Table 2 associated with the Protection Code "LMR_TX" may be used to protect an area associated an LMR where the area is specified by a point and buffer. The Protection shown in Table 2 associated with the Protection Code "CO_BORDER" may be used to protect a border, such as at the edge of the regulatory domain (e.g., often an international border), and may be specified by a line or series of line segments. A Protection associated with the Protection Code "PMSE_RX," for example, may be used to protect an area associated with a wireless microphone system or other ad-hoc radio device and where the area is specified by a point and buffer or by a polygon. As an alternative, the Protection shown in Table 2 associated with the Protection Code "PMSE_TX" may be used to protect an area associated with a wireless microphone system or other ad-hoc radio device where the area is specified by a point and buffer.

In one embodiment, geographic areas are specified using an Open Geospatial Consortium (OGC) well-known text (WKT) format, or other appropriate format. Depending on the desired Policy and type of area protected, the coverage area in the Protection Data may be specified as a polygon, a line (or linestring), a point, a point and buffer (e.g., an area surrounding the point, typically expressed as a radius value), etc.

Start and end times may be expressed using a format convention that includes a date and time. If a start time and/or an end time is left blank in the Protection Date, an assumption may be made that the Policy is to be imposed at all times into the future.

Table 3 shows an exemplary data structure for Protection Data for an exemplary set of Protections. In one embodiment, values in some fields may be required (indicated by the word "required" in the corresponding field) and values in some fields may be optional (indicated by the word "optional" in the corresponding field). A dash ("-") is present where no data in this example is needed. Formats for area values are specified with a corresponding area format name. The "identifier" column is mentioned above and used to differentiate the resulting Policy instances from one another, especially in situations where a Protection is used more than once to establish multiple Policies.

Listing 1 is an example of a CSV file in the foregoing format with representative Protection Data.

LISTING 1:

CO_BORDER,BORDER_11,11,"LINESTRING (103.602861 1.264167, 103.616167 1.314306, 103.617083 1.315417, 103.617833 1.321611, 103.630056 1.341056, 103.635556 1.352028, 103.637639 1.357389, 103.640889 1.362972, 103.649194 1.379917, 103.652972 1.387083, 103.6535 1.391278, 103.657167 1.400417, 103.663917 1.410472, 103.669444 1.41575, 103.673889 1.428139, 103.683333 1.43725, 103.694056 1.439889, 103.698861 1.443306, 103.70375 1.450778, 103.714111 1.457472, 103.728333 1.460139, 103.739806 1.454611, 103.746778 1.450389, 103.760694 1.448389, 103.771028 1.452722, 103.771111 1.452778, 103.790472 1.465139, 103.803667 1.4765, 103.812667 1.478472, 103.822167 1.476694, 103.834167 1.473, 103.852 1.466167, 103.858667 1.462944, 103.864972 1.458861, 103.868167 1.456528, 103.875028 1.448972)",,,
LMR_TX,LMR_TX_46,46,POINT(103.941511 1.310086),6000,22/6/2015 10:00 AM,23/6/2015 11:00 AM,,,,
LMR_TX,LMR_TX_48,48,POINT(103.941511 1.310086),6000,22/6/2015 10:00 AM,23/6/2015 11:00 AM,,,,
MIC_SAFE,MIC_25,25,,,,
MIC_SAFE,MIC_47,47,,,,
NOT_AVAILABLE,NOT_AVAILABLE_5,5,,,,
NOT_AVAILABLE,NOT_AVAILABLE_59,59,,,,
NOT_AVAILABLE,NOT_AVAILABLE_60,60,,,,
PMSE_TX,PMSE_TX_42,42,POINT(103.676428 1.421433),400,22/6/2015 10:00 AM,23/6/2015 11:00 AM,,,,
PMSE_TX,PMSE_TX_44,44,POINT(103.676428 1.421433),400,22/6/2015 10:00 AM,23/6/2015 11:00 AM,,,,
TV_ADJ_ANALOG,ADJ_ANALOG_6,6,,,,
TV_ADJ_ANALOG,ADJ_ANALOG_7,7,,,,
TV_ADJ_ANALOG,ADJ_ANALOG_33,33,,,,
TV_ADJ_DIGITAL,ADJ_DIGITAL_34,34,,,,
TV_ADJ_DIGITAL,ADJ_DIGITAL_35,35,,,,
TV_ADJ_DIGITAL,ADJ_DIGITAL_36,36,,,,
TV_BROADCAST,ANALOG_5,5,,,,

Once the Policy Library 44 is populated with Policies, the Policies may be "executed" with the Dynamic Radio Data 46 that is associated with the requesting radio device 12. Reference to "execution" of a Policy refers to the application of the Policy as part of the process of making a spectrum allocation to a radio device 12 that requests access to spectrum. Execution of certain Policy instances may rely on the input of data resulting from execution of another Policy. Therefore, dependencies among information sets or derived values may affect the order in which Policies may be

TABLE 3

| Protection Code | Identifier | Channel Number | Area | Buffer | Start Time | Stop Time |
|---|---|---|---|---|---|---|
| NOT_AVAILABLE | required | required | — | — | — | — |
| TV_BROADCAST | required | required | — | — | — | — |
| MIC_SAFE | required | required | — | — | — | — |
| TV_ADJ_DIGITAL | required | required | — | — | — | — |
| HPC | required | required | — | — | — | — |
| TV_ADJ_ANALOG | required | required | — | — | — | — |
| LMR_RX | required | required | POINT or POLYGON | — | optional | optional |
| LMR_TX | required | required | POINT | meters | optional | optional |
| CO_BORDER | required | required | LINESTRING | — | optional | optional |
| PMSE_RX | required | required | POINT or POLYGON | — | optional | optional |
| PMSE_TX | required | required | POINT | meters | optional | optional |

In the embodiment where the Protection Data is an import file in a CSV format, the fields for each set of Protection Data values to establish a Policy may be specified in the following exemplary format:

"ProtectionCode,Identifier,ChannelNumber,Area,Buffer, StartTime,StopTime".

executed. An order of operations may be established to optimize process flow, to reduce computation time (e.g., by not executing Policies that are rendered redundant or unnecessary by a high priority policy), and to avoid contention among Policies. To this end, a hierarchy of policy priorities may be established including, for example, high priority Policies, medium priority Policies, and low priority Policies.

High priority policies, which are run first in the execution order, are Policies that are always applied. These Policies are executed first since the results of the policy application process for these Policies may be used as pre-requisites or data for lower priority policy application. Execution of high priority policies may also render subsequent operations simpler, redundant or unnecessary. An example of a high priority policy is "only fixed devices may access the spectrum medium, and mobile operation is prohibited."

Middle (or medium) priority Policies are user configurable by inheriting Policy Parameters that are configured in a user interface, as described above.

Low priority policies generally include auditing or management functions. These policies may even be applied as a post-process operation, after policy instructions and/or spectrum access credentials have been supplied to the requesting radio device 12. Although other auditing or management functions may be specified in Policies, exemplary auditing or management functions relate to verification of the requesting radio device 12. For instance, one or more Policies may confirm that the radio device 12 or operator is properly registered, that the request for spectrum is properly formatted, that the geolocation of the radio device 12 has been confirmed, that an identifier of the radio device 12 (e.g., FCC ID) is approved for use in the regulatory domain, that the radio device 12 is not blacklisted, etc.

C. Conclusion

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum, including but not limited to shared spectrum environments such as white spaces (e.g., TV white spaces or TVWS) where available channels are interleaved with licensed channels. Furthermore, the methods and systems are generic to some radio device characteristics, which could include one or more of modulation schemes, harmonic considerations, frequency bands or channels used by the electronic device, the type of data or information that is transmitted, how the electronic device uses received information, and other similar communications considerations. Thus, the systems and methods have application in any suitable environment.

Although certain embodiments have been shown and described, it is understood that equivalents and modifications falling within the scope of the appended claims will occur to others who are skilled in the art upon the reading and understanding of this specification.

What is claimed is:

1. A method of governing spectrum access comprising:
   receiving a request for spectrum access information from a wireless device;
   selecting, in response to the request, a policy construct from a collection of predetermined general policy constructs that are applicable to a plurality of regulatory domains;
   setting, responsive to the selection, a first variable of the selected policy construct to a first value based at least in part on a a geographic area occupied by the wireless device;
   setting, responsive to the selection, a second variable of the selected policy construct to a second value based at least in part on incumbent spectrum use in the geographic area; and
   transmitting the policy construct to the wireless device based at least in part on capability or physical characteristics of the wireless device.

2. The method of claim 1, further comprising:
   applying a code to the selected policy construct as an identifier.

3. The method of claim 1, further comprising applying an identifier value as part of protection data for the policy construct as an identifier of the policy construct.

4. The method of claim 1, wherein the selected general policy construct is selected multiple times.

5. The method of claim 1, further comprising:
   reselecting the policy construct; and
   setting a first variable of the reselected policy construct to a different value than the first value.

6. The method of claim 1, wherein the second variable specifies at least one of a time-related value, an area-related value or a frequency-related value to enforce interference protection for a corresponding incumbent radio device.

7. The method of claim 1, further comprising: applying the policy construct to radio data associated with the requesting radio device to construct spectrum access credentials for the requesting radio device that include at least one available channel or frequency on which the requesting radio device is authorized to engage in wireless communications.

8. The method of claim 7, wherein the applying the policy construct includes establishing an order in which the policy construct is executed relative to other policy constructs.

9. The method of claim 1, further comprising: resetting the second variable to a different value than the second value to create a revised policy construct that is specific to the geographic area according to current incumbent spectrum use in the geographic area.

10. A spectrum access system that governs allocation of spectrum access comprising:
   a communications interface over which communications with requesting radio devices are made;
   a memory that stores a spectrum policy manager; and
   a processor that executes the spectrum policy manager, executing the spectrum policy manager configuring the spectrum access system to:
   receive a request for spectrum access information from a wireless device;
   select, in response to the request, a policy construct from a collection of predetermined general policy constructs that are applicable to a plurality of regulatory domains;
   set, responsive to the selection, a first variable of the selected policy construct to a first value based at least in part on a geographic area occupied by the wireless device;
   set, responsive to the selection, a second variable of the selected policy construct to a second value based at least in part on incumbent spectrum use in the geographic area; and
   transmit the policy construct to the wireless device based at least in part on capability or physical characteristics of the wireless device.

11. The spectrum access system of claim 10, wherein executing the spectrum policy manager further configures the spectrum access system to apply a code to the selected policy as an identifier.

12. The spectrum access system of claim 10, wherein executing the spectrum policy manager further configures the spectrum access system to apply an identifier value as part of protection data for the policy as an identifier of policy construct.

13. The spectrum access system of claim 10, wherein the selected policy construct is selected multiple times.

14. The spectrum access system of claim 10, wherein executing the spectrum policy manager further configures the spectrum access system to:
reselect the policy construct; and
set a first variable of the reselected policy construct to a different value than the first value.

15. The spectrum access system of claim 10, wherein the second variable specifies at least one of a time-related value, an area-related value or a frequency-related value to enforce interference protection for a corresponding incumbent radio device.

16. The spectrum access system of claim 10, wherein executing the spectrum policy manager further configures the spectrum access system to:
apply the policy construct to radio data associated with the requesting radio device to construct spectrum access credentials for the requesting radio device that include at least one available channel or frequency on which the requesting radio device is authorized to engage in wireless communications.

17. The spectrum access system of claim 16, wherein the applying the policy construct includes establishing an order in which the policy construct is executed relative to other policy constructs.

18. The spectrum access system of claim 10, wherein executing the spectrum policy manager further configures the spectrum access system to:
reset the second variable to a different value than the second value to create a revised policy construct that is specific to the geographic area according to current incumbent spectrum use in the geographic area.

* * * * *